US011028785B2

United States Patent
Asai

(10) Patent No.: US 11,028,785 B2
(45) Date of Patent: Jun. 8, 2021

(54) CONTROL DEVICE FOR INTERNAL COMBUSTION ENGINE AND CONTROL METHOD FOR INTERNAL COMBUSTION ENGINE

(71) Applicant: Yanmar Co., Ltd., Osaka (JP)

(72) Inventor: Go Asai, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 21 days.

(21) Appl. No.: 16/316,820

(22) PCT Filed: Jun. 29, 2017

(86) PCT No.: PCT/JP2017/024044
§ 371 (c)(1),
(2) Date: Jan. 10, 2019

(87) PCT Pub. No.: WO2018/012304
PCT Pub. Date: Jan. 18, 2018

(65) Prior Publication Data
US 2019/0226410 A1    Jul. 25, 2019

(30) Foreign Application Priority Data
Jul. 14, 2016 (JP) .............................. JP2016-139570

(51) Int. Cl.
*F02D 19/06* (2006.01)
*F02D 19/08* (2006.01)
(Continued)

(52) U.S. Cl.
CPC .......... *F02D 19/0671* (2013.01); *F02B 43/04* (2013.01); *F02B 43/12* (2013.01);
(Continued)

(58) Field of Classification Search
CPC ............... F02D 41/0047; F02D 41/005; F02D 41/0052; F02D 41/0055; F02D 41/0057;
(Continued)

(56) References Cited

U.S. PATENT DOCUMENTS

| 2004/0144337 A1* | 7/2004 | Wakao ................... F02M 23/10 123/3 |
| 2006/0112940 A1* | 6/2006 | Roberts, Jr. ............. F02D 25/00 123/568.11 |

(Continued)

FOREIGN PATENT DOCUMENTS

| DE | 102012204649 A1 * | 9/2013 | ............. F02M 26/36 |
| EP | 2216537 A | 8/2010 | |

(Continued)

OTHER PUBLICATIONS

English machine translation provided by ip.com of JP 2009144555 A (Year: 2020).*

(Continued)

*Primary Examiner* — Jacob M Amick
*Assistant Examiner* — Michael A Kessler
(74) *Attorney, Agent, or Firm* — Norton Rose Fulbright US LLP

(57) ABSTRACT

An internal combustion engine in which a fuel reforming operation in a fuel reformation cylinder is not executed when a gas temperature of a fuel reformation chamber at a time point when a piston in the fuel reformation cylinder reaches a compression top dead point is estimated to fall short of a reforming operation allowable lower limit gas temperature set based on a lower limit value of a reforming reaction enabling temperature. For example, fuel is supplied from an injector so that an equivalence ratio in the fuel reformation chamber is less than 1. Alternatively, the fuel supply from an injector is stopped. This way, a supply of (Continued)

non-reformed fuel from the fuel reformation cylinder to an output cylinder can be avoided, and knocking in the output cylinder can be avoided.

10 Claims, 6 Drawing Sheets

(51) Int. Cl.
| | |
|---|---|
| *F02D 41/14* | (2006.01) |
| *F02M 26/36* | (2016.01) |
| *F02B 43/12* | (2006.01) |
| *F02M 25/00* | (2006.01) |
| *F02D 41/00* | (2006.01) |
| *F02D 41/40* | (2006.01) |
| *F02D 19/10* | (2006.01) |
| *F02D 41/18* | (2006.01) |
| *F02B 43/04* | (2006.01) |
| *F02D 41/04* | (2006.01) |
| *F02D 41/06* | (2006.01) |

(52) U.S. Cl.
CPC ..... *F02D 19/0607* (2013.01); *F02D 19/0615* (2013.01); *F02D 19/0628* (2013.01); *F02D 19/0644* (2013.01); *F02D 19/08* (2013.01); *F02D 19/081* (2013.01); *F02D 19/10* (2013.01); *F02D 19/105* (2013.01); *F02D 41/0025* (2013.01); *F02D 41/0027* (2013.01); *F02D 41/1475* (2013.01); *F02D 41/18* (2013.01); *F02D 41/403* (2013.01); *F02M 25/00* (2013.01); *F02M 26/36* (2016.02); *F02D 41/042* (2013.01); *F02D 41/062* (2013.01); *F02D 2200/0606* (2013.01)

(58) Field of Classification Search
CPC ............ F02D 41/0065; F02D 41/0067; F02D 41/025; F02D 19/0671; F02D 19/087; F02D 2041/007; F02M 26/36; F02M 27/02
USPC .............................................. 123/3; 701/108
See application file for complete search history.

(56) References Cited

U.S. PATENT DOCUMENTS

| | | | | |
|---|---|---|---|---|
| 2006/0169246 | A1* | 8/2006 | Asai ................... | F01L 13/0042 123/305 |
| 2009/0308070 | A1* | 12/2009 | Alger, II ............ | F02D 13/0238 60/602 |
| 2010/0212611 | A1* | 8/2010 | Yahagi ................... | F02M 26/15 123/3 |
| 2011/0137537 | A1* | 6/2011 | Leone ................. | F02D 41/0027 701/102 |
| 2014/0216394 | A1* | 8/2014 | Matsuda ............... | F02D 19/084 123/295 |
| 2015/0369178 | A1* | 12/2015 | Asai ..................... | F02D 41/0025 123/3 |
| 2017/0089306 | A1* | 3/2017 | Shimada .................. | F02B 9/02 |
| 2017/0284315 | A1* | 10/2017 | Asai ....................... | F02M 33/00 |
| 2019/0153965 | A1* | 5/2019 | Asai ........................ | F02D 19/02 |
| 2019/0234354 | A1* | 8/2019 | Asai ....................... | F02M 26/25 |
| 2019/0249626 | A1* | 8/2019 | Asai ................... | F02D 19/0671 |
| 2019/0293003 | A1* | 9/2019 | Asai ........................ | F02B 51/02 |
| 2019/0293012 | A1* | 9/2019 | Asai ................... | F02D 19/0671 |
| 2019/0301382 | A1* | 10/2019 | Asai ........................ | F02D 45/00 |

FOREIGN PATENT DOCUMENTS

| | | | | |
|---|---|---|---|---|
| JP | 52-009712 | A | | 1/1977 |
| JP | 08291774 | A | * | 11/1996 |
| JP | 2004284835 | A | * | 10/2004 |
| JP | 2006052662 | A | * | 2/2006 |
| JP | 2006057625 | A | * | 3/2006 |
| JP | 2006057625 | A | | 3/2006 |
| JP | 2007113420 | A | * | 5/2007 |
| JP | 2007332891 | A | * | 12/2007 |
| JP | 2009097425 | A | * | 5/2009 |
| JP | 2009144555 | A | * | 7/2009 ............ F02M 27/02 |
| JP | 2010001793 | A | * | 1/2010 |
| JP | 2010-025073 | A | | 2/2010 |
| JP | 2014-136978 | A | | 7/2014 |
| JP | 2016-070101 | A | | 5/2016 |
| JP | 2016-094930 | A | | 5/2016 |
| WO | WO-2009063760 | A1 | * | 5/2009 ............ F02M 26/36 |
| WO | 2016035735 | A1 | | 3/2016 |

OTHER PUBLICATIONS

English machine translation provided by Espacenet of JP-08291774-A (Year: 2020).*
English machine translation provided by Espacenet of JP-2007113420-A (Year: 2020).*
International Search Report dated Sep. 19, 2017 issued in corresponding PCT Application PCT/JP2017/024044 cites the patent documents above.
European Search Report dated May 31, 2019 issued in corresponding EP Application 17827434.6 cites the patent documents above.

* cited by examiner

CONTROL DEVICE FOR INTERNAL COMBUSTION ENGINE AND CONTROL METHOD FOR INTERNAL COMBUSTION ENGINE

CROSS REFERENCES TO RELATED APPLICATIONS

This application is a national stage application pursuant to 35 U.S.C. § 371 of International Application No. PCT/JP2017/024044, filed on Jun. 29, 2017 which claims priority under 35 U.S.C. § 119 to Japanese Patent Application No. 2016-139570 filed on Jul. 14, 2016, the disclosures of which are hereby incorporated by reference in their entireties.

TECHNICAL FIELD

The present invention relates to a control device for an internal combustion engine and a control method of an internal combustion engine. In particular, the present invention relates to a control device and a control method applied to an internal combustion engine including a fuel reformation cylinder capable of functioning as a fuel reformation device.

BACKGROUND ART

Traditionally, there has been known an internal combustion engine having a fuel reformation cylinder and an output cylinder (e.g., Patent Literature 1, hereinafter, PTL 1). This type of internal combustion engine reforms fuel in a fuel reformation cylinder. Then, the fuel after reformation (hereinafter, reformed fuel) is combusted in the output cylinder to obtain an engine power.

Specifically, a fuel such as light oil or heavy oil is supplied to the fuel reformation cylinder, and an air-fuel mixture having a high equivalence ratio is adiabatically compressed within the fuel reformation cylinder. As a result, the fuel is reformed under a high temperature and high pressure environment, and a reformed fuel (fuel with a high octane value) having a high anti-knock property such as hydrogen, carbon monoxide, and methane is generated. This reformed fuel is then supplied to the output cylinder together with the air, and the lean mixture is combusted (uniform lean combustion) in the output cylinder, to yield an engine power.

With this type of internal combustion engine, uniform lean combustion is performed in the output cylinder. The NOx emission amount and the soot discharge amount can therefore be reduced. Further, since a fuel with a high anti-knock property is combusted, knocking is suppressed or reduced, and since diesel micro-pilot ignition (ignition of reformed fuel by supplying a small amount of fuel into the output cylinder) enables combustion at a suitable timing, the combustion efficiency can be also improved.

CITATION LIST

Patent Literature

PTL 1: Japanese Patent Application Laid-Open No. 2014-136978

SUMMARY OF INVENTION

Technical Problem

In order to cause a fuel reforming reaction in the fuel reformation cylinder, the gas temperature in the fuel reformation cylinder needs to reach a predetermined temperature (a temperature that enables reforming reaction). For example, in cases where the fuel reformation cylinder is a reciprocation type constituted by a piston crank mechanism, the gas temperature in the fuel reformation cylinder needs to reach the predetermined temperature, at the time point where the piston reaches the compression top dead point. In other words, if the gas temperature in the fuel reformation cylinder has not yet reached the predetermined temperature at this time point, the reforming reaction of the fuel in the fuel reformation cylinder is not possible, or the reforming reaction may not be sufficient. Such a circumstance may likely to take place, for example, immediately after cold start of the internal combustion engine, or in an environment with low outside air temperature, high altitude, or the like.

If the reforming reaction is not possible, fuel with a low anti-knock property is supplied to the output cylinder, leading to a situation where occurrence of knocking in the output cylinder is concerned. Further, if a fuel with a high boiling point is used, the fuel may be re-condensed at the outlet of the reforming cylinder, and may be discharged without contribution to combustion.

The present invention is made in view of the above problems, and it is an object of the present invention to, for an internal combustion engine having a fuel reformation cylinder and an output cylinder, provide a control device of the internal combustion engine and a control method of the internal combustion engine, which can avoid a situation where non-reformed fuel being supplied from the fuel reformation cylinder to the output cylinder.

Solution to Problem

A solution of the present invention to achieve the above-described object premises a control device to be applied to an internal combustion engine including a fuel reformation cylinder capable of serving as a fuel reformation device and an output cylinder to which reformed fuel generated in the fuel reforming cylinder is supplied, the output cylinder configured to yield an engine power by combusting the reformed fuel. Such a control device for an internal combustion engine includes a reforming operation control unit configured not to execute a fuel reforming operation in the fuel reformation cylinder, when a gas temperature at a time point when a periodically changing gas temperature in the fuel reformation cylinder reaches its highest temperature is estimated as to fall short of a reforming operation allowable lower limit gas temperature set based on a lower limit value of a reforming reaction enabling temperature.

As specified above, the reforming operation control unit does not execute the fuel reforming operation in the fuel reformation cylinder, when a gas temperature at a time point when the periodically changing gas temperature in the fuel reformation cylinder reaches its highest temperature is estimated as to fall short of the reforming operation allowable lower limit gas temperature. This way, supply of non-reformed fuel from the fuel reformation cylinder to the output cylinder due to a low gas temperature can be avoided. Therefore, a fuel with a low anti-knock property is not supplied to the output cylinder, and knocking in the output cylinder can be avoided.

Further, the fuel reformation cylinder is preferably structured as a reciprocation type in which a piston reciprocates in the cylinder, and the reforming operation control unit is preferably configured not to execute the fuel reforming operation in the fuel reformation cylinder, when the gas temperature in the fuel reformation cylinder at a time point when the piston in the fuel reformation cylinder reaches a compression top dead point is estimated to fall short of the reforming operation allowable lower limit gas temperature.

In general, the gas in the fuel reformation cylinder is in the most compressed state when the piston reaches the compression top dead point, and the gas temperature at this point is the highest temperature in a single cycle. Therefore, by determining whether or not the gas temperature in the fuel reformation cylinder when the piston reaches the compression top dead point reaches the reforming operation allowable lower limit gas temperature, whether or not the reforming reaction of the fuel is possible in the cycle can be determined. As a result, whether to execute the fuel reforming operation in the fuel reformation cylinder can be accurately determined.

Further, the reforming operation allowable lower limit gas temperature is preferably set so as to be higher with an increase in an equivalence ratio in the fuel reformation cylinder.

To enable reforming reaction in the fuel reformation cylinder, the gas temperature in the fuel reformation cylinder needs to be set higher with an increase in the equivalence ratio in the fuel reformation cylinder. Therefore, the reforming operation allowable lower limit gas temperature is also set higher with an increase in the equivalence ratio in the fuel reformation cylinder. This way, whether to execute the fuel reforming operation in the fuel reformation cylinder can be accurately determined, even if the equivalence ratio in the fuel reformation cylinder is varied. As the result, supply of non-reformed fuel from the fuel reformation cylinder to the output cylinder can be avoided.

In this case, the reforming operation allowable lower limit gas temperature is preferably corrected based on the type of fuel to be supplied to the fuel reformation cylinder.

The lower limit value of the reforming reaction enabling temperature varies depending on not only the equivalence ratio in the fuel reformation cylinder, but also on the type of the fuel. For example, the reactivity of the fuel varies depending on the ratio of carbon and hydrogen in the fuel and the bonding structure thereof. Therefore, the lower limit value of the reforming reaction enabling temperature varies depending on the type of fuel. To cope with this, in the present solution, the reforming operation allowable lower limit gas temperature is corrected based on the type of the fuel to be supplied to the fuel reformation cylinder. This way, the reforming operation allowable lower limit gas temperature can be set to an appropriate value.

The fuel reforming operation in the fuel reformation cylinder is preferably not executed during a start mode operation executed at an early start-up stage of the internal combustion engine and during a stop mode operation executed at a time of stopping the internal combustion engine, irrespective of the gas temperature at the time point when the gas temperature in the fuel reformation cylinder reaches its highest temperature.

During the start mode of the internal combustion engine, no fuel reforming reaction is expectable in the fuel reformation cylinder, due to the low rotational speed of the internal combustion engine. On the other hand, during the stop mode operation of the internal combustion engine, fuel supply to the fuel reformation cylinder should be stopped. Therefore, in the start mode operation and the stop mode operation, the fuel reforming operation in the fuel reformation cylinder is not executed.

Further, when the fuel reforming operation in the fuel reformation cylinder is not executed, an amount of fuel within a range that allows fuel combustion in the fuel reformation cylinder and that makes the equivalence ratio in the fuel reformation cylinder less than 1 is preferably supplied to the fuel reformation cylinder.

In this case, the warming-up of the fuel reformation cylinder is promoted by the combustion of the fuel in the fuel reformation cylinder, and the gas temperature in the fuel reformation cylinder reaches the reforming operation allowable lower limit gas temperature in a relatively short period of time. Therefore, the fuel reforming operation can be started at an early stage.

Further, when the fuel reforming operation in the fuel reformation cylinder is not executed, fuel supply to the fuel reformation cylinder may be stopped, and an amount of fuel within a range that allows fuel combustion in the output cylinder may be supplied to the output cylinder.

This way, supply of non-reformed fuel from the fuel reformation cylinder to the output cylinder, during the state where the gas temperature in the fuel reformation cylinder, can be reliably avoided. Further, an engine power can be obtained by fuel combustion in the output cylinder.

Further, the scope of the technical thought of the present invention encompasses a control method for the internal combustion engine implemented by the control device for the internal combustion engine according to each of the above described solutions. Namely, it is premised that a control method is applied to an internal combustion engine includes a fuel reformation cylinder capable of serving as a fuel reformation device and an output cylinder to which reformed fuel generated in the fuel reformation cylinder is supplied, the output cylinder configured to yield an engine power by combusting the reformed fuel. In such a control method for an internal combustion engine, a fuel reforming operation in the fuel reformation cylinder is not executed, when a gas temperature at a time point when a periodically changing gas temperature in the fuel reformation cylinder reaches its highest temperature is estimated as to fall short of a reforming operation allowable lower limit gas temperature set based on a lower limit value of a reforming reaction enabling temperature.

With this control method too, supply of non-reformed fuel from the fuel reformation cylinder to the output cylinder due to a low gas temperature can be avoided, as is hereinabove described. Therefore, a fuel with a low anti-knock property is not supplied to the output cylinder, and knocking in the output cylinder can be avoided.

Advantageous Effects of Invention

In the present invention, the fuel reforming operation in the fuel reformation cylinder is not executed, when a gas temperature at a time point when the periodically changing gas temperature in the fuel reformation cylinder reaches its highest temperature is estimated as to fall short of the reforming operation allowable lower limit gas temperature. This way, supply of non-reformed fuel from the fuel reformation cylinder to the output cylinder due to a low gas temperature can be avoided. As a result, a fuel with a low anti-knock property is not supplied to the output cylinder, and knocking in the output cylinder can be avoided.

DESCRIPTION OF EMBODIMENTS

The following describes an embodiment of the present invention based on the attached drawings. The present embodiment deals with a case where the present invention is applied to an internal combustion engine for a ship.

—System Structure of Internal Combustion Engine—

Figure 1:
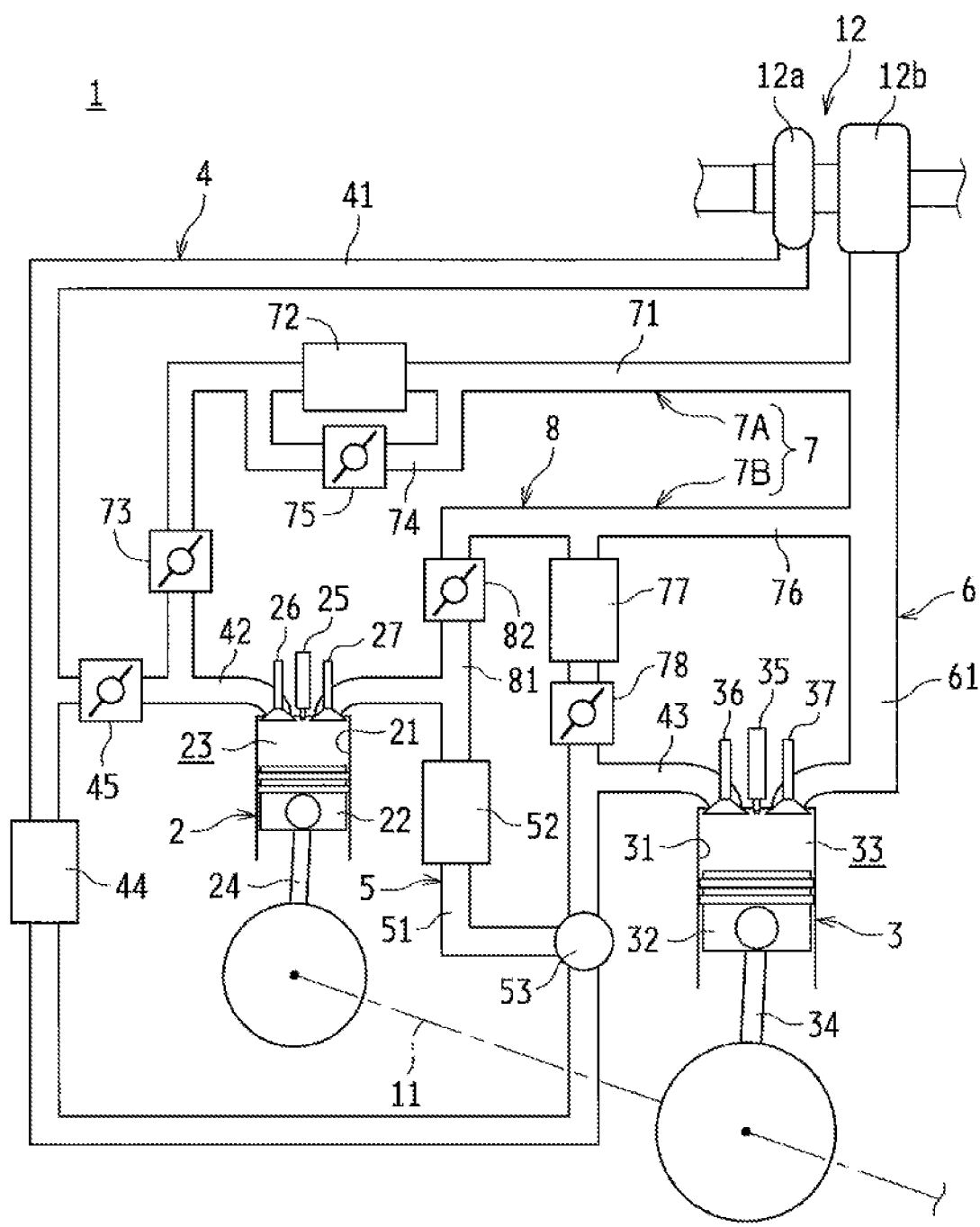
FIG. 1 A diagram showing a system structure of an internal combustion engine related to an embodiment.

FIG. 1 is a diagram showing a system structure of an internal combustion engine related to the present embodiment.

As shown in FIG. 1, the internal combustion engine 1 according to the present embodiment includes a fuel reformation cylinder 2 and an output cylinder 3. Further, the internal combustion engine 1 includes, as a piping system for supplying (introducing) gas or discharging (leading out) a gas to and from the fuel reformation cylinder 2 and the output cylinder 3, an air-intake system 4, a reformed fuel supply system 5, an exhaust system 6, an EGR system 7, and an output cylinder bypass system 8.

(Fuel Reformation Cylinder and Output Cylinder)

The fuel reformation cylinder 2 and the output cylinder 3 are both structured as a reciprocation type. Specifically, the cylinders 2, 3 have, in their cylinder bores 21, 31 formed in a cylinder block (not shown), pistons 22, 32 in such a manner as to be able to reciprocate, respectively. In the fuel reformation cylinder 2, a fuel reformation chamber 23 is formed by the cylinder bore 21, the piston 22, and a not-shown cylinder head. In the output cylinder 3, a combustion chamber 33 is formed by the cylinder bore 31, the piston 32, and a not-shown cylinder head.

The internal combustion engine 1 of the present embodiment includes four cylinders in the cylinder block, and one of the cylinders is structured as the fuel reformation cylinder 2, whereas three other cylinders are structured as the output cylinder 3. Reformed fuel generated by the fuel reformation cylinder 2 is supplied to each output cylinder 3. The numbers of the cylinders 2, 3 are not limited to the above. For example, the cylinder block may include six cylinders, and two of the cylinders are structured as the fuel reformation cylinder 2, whereas four other cylinders are structured as the output cylinder 3.

The pistons 22, 32 of the cylinders 2, 3 are connected to a crankshaft 11 through connecting rods 24, 34, respectively. This way, the motion is converted from reciprocation of the pistons 22, 32 to rotation of the crankshaft 11. The crankshaft 11 can be connected to a screw shaft of the ship through a clutch mechanism (not shown). The piston 22 of the fuel reformation cylinder 2 and the piston 32 of the output cylinder 3 are connected to each other through the connecting rods 24, 34 and the crankshaft 11. This enables power transmission between the cylinders 2, 3, transmission of output power from the cylinders 2, 3 to the screw shaft, and the like.

The fuel reformation cylinder 2 includes an injector 25 configured to supply a pre-reformed fuel such as light oil to the fuel reformation chamber 23. With supply of fuel from the injector 25, the fuel reformation chamber 23 adiabatically compresses air-fuel mixture with a high equivalence ratio. As a result, the fuel is reformed under a high temperature and high pressure environment, and a reformed fuel having a high anti-knock property such as hydrogen, carbon monoxide, and methane is generated.

The output cylinder 3 includes an injector 35 configured to supply a fuel such as light oil to the combustion chamber 33. To the combustion chamber 33, the reformed fuel generated in the fuel reformation cylinder 2 is supplied together with the air. Then, premixed combustion of the lean mixture is performed in the combustion chamber 33. This way, the crankshaft 11 rotates with reciprocation of the piston 32, and an engine power is obtained.

(Air-Intake System)

The air-intake system 4 is configured to introduce air (fresh air) to the fuel reformation chamber 23 of the fuel reformation cylinder 2 and the combustion chamber 33 of the output cylinder 3.

The air-intake system 4 includes a main air-intake passage 41. This main air-intake passage 41 is branched into two systems: i.e., a fuel reformation cylinder air-intake passage 42 and an output cylinder air-intake passage 43. The main air-intake passage 41 includes a compressor wheel 12a of a turbocharger 12. The fuel reformation cylinder air-intake passage 42 communicates with the air-intake port of the fuel reformation cylinder 2. Between this air-intake port and the fuel reformation chamber 23 of the fuel reformation cylinder 2, an air-intake valve 26 that can open/close is arranged. Further, the fuel reformation cylinder air-intake passage 42 includes an air-intake amount adjust valve 45 whose opening degree is adjustable. The output cylinder air-intake passage 43 communicates with an air-intake port of the output cylinder 3. Between this air-intake port and the combustion chamber 33 of the output cylinder 3, an air-intake valve 36 that can open/close is arranged. Further, the output cylinder air-intake passage 43 includes an intake-air cooler (inter cooler) 44.

(Reformed Fuel Supply System)

The reformed fuel supply system 5 supplies reformed fuel generated in the fuel reformation cylinder 2 to the combustion chamber 33 of the output cylinder 3.

The reformed fuel supply system 5 includes a reformed fuel supply passage 51 The reformed fuel supply passage 51 includes a reformed fuel cooler 52. An upstream end of the reformed fuel supply passage 51 communicates with the exhaust port of the fuel reformation cylinder 2. Between this exhaust port and the fuel reformation chamber 23 of the fuel reformation cylinder 2, an exhaust valve 27 that can open/close is arranged. A downstream end of the reformed fuel supply passage 51 communicates with the output cylinder air-intake passage 43. In a communicating portion between the reformed fuel supply passage 51 and the output cylinder air-intake passage 43, a mixer 53 is provided. In the mixer 53, the reformed fuel generated by the fuel reformation cylinder 2 is mixed with the air flowing through the output cylinder air-intake passage 43, and is supplied to the combustion chamber 33 of the output cylinder 3.

(Exhaust System)

The exhaust system 6 is configured to discharge exhaust gas generated in the output cylinder 3. The exhaust system 6 includes an exhaust passage 61. The exhaust passage 61 includes a turbine wheel 12b of the turbocharger 12. The exhaust passage 61 communicates with an exhaust port of the output cylinder 3. Between this exhaust port and the combustion chamber 33 of the output cylinder 3, an exhaust valve 37 that can open/close is arranged.

(EGR System)

An EGR system 7 includes a fuel reformation cylinder EGR system 7A and an output cylinder EGR system 7B.

The fuel reformation cylinder EGR system 7A is configured to direct and supply a part of exhaust gas to the fuel reformation chamber 23 of the fuel reformation cylinder 2, the exhaust gas flowing through the exhaust passage 61. The fuel reformation cylinder EGR system 7A includes a fuel reformation cylinder EGR passage 71. The fuel reformation cylinder EGR passage 71 has its upstream end communicated with the exhaust passage 61, and has its downstream end communicated with the downstream side of the air-intake amount adjust valve 45 in the fuel reformation cylinder air-intake passage 42, respectively. The fuel reformation cylinder EGR passage 71 includes an EGR gas cooler 72. On the downstream side of the EGR gas cooler 72 in the fuel reformation cylinder EGR passage 71 (in a position closer to the fuel reformation cylinder air-intake passage 42), an EGR gas amount adjusting valve 73 is provided. Further, the fuel reformation cylinder EGR system 7A is provided with a cooler bypass passage 74 for letting the EGR gas bypassing the EGR gas cooler 72. In the cooler bypass passage 74, a bypass amount adjusting valve 75 is provided.

The output cylinder EGR system 7B is configured to return a part of exhaust gas to the combustion chamber 33 of the output cylinder 3, the exhaust gas flowing through the exhaust passage 61. The output cylinder EGR system 7B includes an output cylinder EGR passage 76. The output cylinder EGR passage 76 has its upstream end communicated with the exhaust passage 61, and has its downstream end communicated with the downstream side of a mixer 53 in the output cylinder air-intake passage 43, respectively. The output cylinder EGR passage 76 includes an EGR gas cooler 77. On the downstream side of the EGR gas cooler 77 in the output cylinder EGR passage 76 (in a position closer to the output cylinder air-intake passage 43), an EGR gas amount adjusting valve 78 is provided.

(Output Cylinder Bypass System)

The output cylinder bypass system 8 is used to introduce exhaust gas from the fuel reformation cylinder 2 into the exhaust passage 61 without supplying the gas to the output cylinder 3 (i.e., by bypassing the output cylinder 3). The output cylinder bypass system 8 includes an output cylinder bypass passage 81. The output cylinder bypass passage 81 has its upstream end communicated with the upstream side of a reformed fuel cooler 52 in a reformed fuel supply passage 51, and has its downstream end communicated with the upstream side of the EGR gas cooler 77 (the side close to the exhaust passage 61) in the output cylinder EGR passage 76. Further, the output cylinder bypass passage 81 includes a bypass amount adjusting valve 82.

For the coolers 44, 52, 72, 77 provided in each of the above-described systems, engine cooling water, seawater, or the like is used as a cooling heat source for cooling the gas. Further, the coolers 44, 52, 72, 77 may be of an air-cooled type.

—Control System of Internal Combustion Engine—

Figure 2:
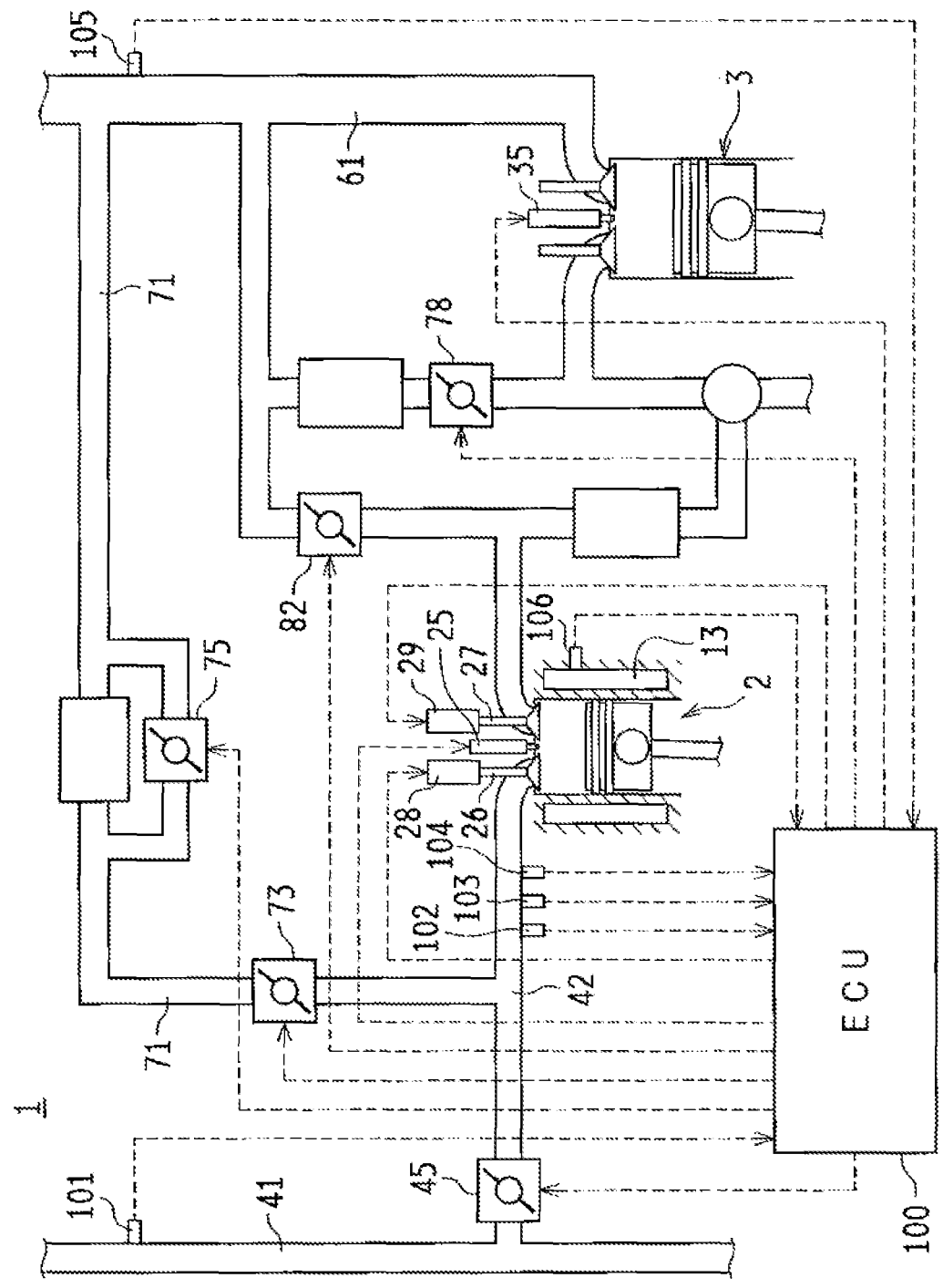
FIG. 2 A diagram showing a schematic structure of a control system of the internal combustion engine.

FIG. 2 is a diagram showing a schematic structure of a control system of the internal combustion engine 1. The internal combustion engine 1 is provided with an ECU (Electronic Control Unit) 100 serving as a control device for controlling various actuators in the internal combustion engine 1. The ECU 100 includes a CPU (Central Processing Unit), a ROM (Read Only Memory), a RAM (Random Access Memory), a backup RAM, and the like.

The ROM stores various control programs, a map which is referred to at a time of executing the various control programs, and the like. The CPU executes arithmetic processing based on the various control programs and maps stored in the ROM. Further, the RAM is a memory for temporarily storing the calculation result of the CPU and data input from various sensors. Further, the backup RAM is a nonvolatile memory which stores data and the like to be saved at a time of system shutdown and the like.

As shown in FIG. 2, the internal combustion engine 1 includes an intake-air flow sensor 101, a taken-in gas pressure sensor 102, a taken-in gas temperature sensor 103, a taken-in gas $O_2$ sensor 104, an exhaust pressure sensor 105, a water temperature sensor 106, and the like.

The intake-air flow sensor 101 transmits, to the ECU 100, an output signal corresponding to the flow rate of the taken-in air (air) flowing in the main air-intake passage 41.

The taken-in gas pressure sensor 102 transmits, to the ECU 100, an output signal corresponding to the pressure of the taken-in gas flowing in the fuel reformation cylinder air-intake passage 42. Specifically, the taken-in gas pressure sensor 102 transmits, to the ECU 100, an output signal corresponding to a taken-in gas pressure at downstream side of a portion of the fuel reformation cylinder air-intake passage 42 communicating with the fuel reformation cylinder EGR passage 71.

The taken-in gas temperature sensor 103 transmits, to the ECU 100, an output signal corresponding to the temperature of the taken-in gas flowing in the fuel reformation cylinder air-intake passage 42. Specifically, the taken-in gas temperature sensor 103 transmits, to the ECU 100, an output signal corresponding to a taken-in gas temperature at downstream side of a portion of the fuel reformation cylinder air-intake passage 42 communicating with the fuel reformation cylinder EGR passage 71.

The taken-in gas $O_2$ sensor 104 transmits, to the ECU 100, an output signal corresponding to the concentration of oxygen in the taken-in gas flowing in the fuel reformation cylinder air-intake passage 42. Specifically, taken-in gas $O_2$ sensor 104 transmits, to the ECU 100, an output signal corresponding to the concentration of oxygen in the taken-in gas at downstream side of a portion of the fuel reformation cylinder air-intake passage 42 communicating with the fuel reformation cylinder EGR passage 71.

The exhaust pressure sensor 105 transmits, to the ECU 100, an output signal corresponding to the pressure of the exhaust gas flowing in the exhaust passage 61. Specifically, the exhaust pressure sensor 105 transmits, to the ECU 100, an output signal corresponding to the pressure of the exhaust gas at upstream side of a portion of the exhaust passage 61 communicating with the fuel reformation cylinder EGR passage 71.

The water temperature sensor 106 transmits, to the ECU 100, an output signal corresponding to the temperature of the cooling water flowing in the cooling water passage 13 formed in the cylinder block. Specifically, water temperature sensor 106 transmits, to the ECU 100, an output signal corresponding to the temperature of the cooling water flowing in the cooling water passage 13 formed around the fuel reformation cylinder 2.

The ECU 100 is electrically connected to each of the injectors 25, 35, the adjusting valves 45, 73, 75, 78, 82, and the like. Further, the air-intake valve 26 and the exhaust valve 27 of the fuel reformation cylinder 2 are provided with variable valve units 28, 29, respectively. This way, the opening and closing timing of the valves 26, 27 can be adjusted. The ECU 100 is also electrically connected to these variable valve units 28, 29. Based on the output signals from the above described various sensors 101 to 106 and the like, the ECU 100 performs: fuel injection control (opening and closing control of the injectors 25, 35) of the injectors 25, 35; opening and closing control of the adjustment valves 45, 73, 75, 78, 82 (gas flow rate control), and opening and closing timing control of the valves 26, 27 by variable valve units 28, 29.

—Basic Operation of Internal Combustion Engine—

Next, a basic operation of the internal combustion engine 1 configured as described above will be described.

In a basic operation after completion of warming up the internal combustion engine 1 (in a state enabling a reforming reaction of the fuel in the fuel reformation chamber 23), the air introduced into the main air-intake passage 41 is pressurized by the compressor wheel 12a of the turbocharger 12. The air is then branched into the fuel reformation cylinder air-intake passage 42 and the output cylinder air-intake passage 43. At this time, the flow rate of the taken-in air flowing through the fuel reformation cylinder air-intake passage 42 is adjusted by the air-intake amount adjust valve 45. Further, the EGR gas having flown through the fuel reformation cylinder EGR system 7A is introduced into the fuel reformation cylinder air-intake passage 42. At this time, the amount of the EGR gas introduced into the fuel reformation cylinder air-intake passage 42 is adjusted by the EGR gas amount adjusting valve 73. Further, the temperature of the EGR gas introduced into the fuel reformation cylinder air-intake passage 42 is adjusted by the amount of EGR gas bypassing the EGR gas cooler 72 according to the opening degree of the bypass amount adjusting valve 75. As a result, the air and the EGR gas are introduced into the fuel reformation chamber 23 of the fuel reformation cylinder 2. At this time, the flow rate of the taken-in air adjusted by the opening degree of the air-intake amount adjust valve 45, the flow rate of the EGR gas adjusted by the opening degree of the EGR gas amount adjusting valve 73, and the temperature of the EGR gas adjusted by the opening degree of the bypass amount adjusting valve 75 are adjusted so as to set a high equivalence ratio in the fuel reformation chamber 23, and to achieve a gas temperature in the fuel reformation chamber 23 that enables favorable fuel reformation. Specifically, the opening degrees of the air-intake amount adjust valve 45, the EGR gas amount adjusting valve 73, and the bypass amount adjusting valve 75 are set so that the equivalence ratio in the fuel reformation chamber 23 at the time of supplying the fuel from the injector 25 to the fuel reformation chamber 23 is, for example, 2.5 or more (preferably, 4.0 or more) and the gas temperature of the fuel reformation chamber 23 is at least a lower limit value of a reforming reaction enabling temperature as will be described later, according to an opening degree setting map prepared in advance based on an experiment or a simulation.

Through the process described above, fuel is supplied from the injector 25 to the fuel reformation chamber 23 while the air and the EGR gas are introduced into the fuel reformation chamber 23 of the fuel reformation cylinder 2. The fuel supply amount from the injector 25 is basically set according to the required engine power. Specifically, the valve opening period of the injector 25 is set so as to achieve a target fuel supply amount according to the fuel pressure in the injector 25. The opening timing of the injector 25 in this case is preferably set such that injection of the target fuel supply amount is completed by the time the air-intake stroke of the fuel reformation cylinder 2 is finished. However, the fuel injection period may be continued up to the middle of the compression stroke, if evenly mixed air-fuel mixture is obtainable before the piston 22 approaches the compression top dead point. This generates a homogeneous mixture (air-fuel mixture having a high equivalence ratio) in the fuel reformation chamber 23 before the piston 22 reaches the compression top dead point.

While the piston 22 moves toward the compression top dead point, the pressure and the temperature of the fuel reformation chamber 23 increase. In the fuel reformation chamber 23, the air-fuel mixture having a high equivalence ratio (e.g., air-fuel mixture having an equivalent ratio of 4.0 or more) is adiabatically compressed. As a result, the dehydrogenation reaction of the fuel, a partial oxidation reaction, a steam reforming reaction, and a thermal dissociation reaction take place under a high temperature and high pressure environment, thus reforming the fuel to generate reformed fuel having a high anti-knock property, such as hydrogen, carbon monoxide, and methane.

The reformed fuel discharged from the fuel reformation chamber 23 is cooled in the reformed fuel cooler 52 while the reformed fuel flows through the reformed fuel supply passage 51. With this cooling, preignition of the reformed fuel in the output cylinder air-intake passage 43 and the combustion chamber 33 is suppressed or reduced. The cooled reformed fuel is then mixed with the air flowing in the output cylinder air-intake passage 43 in the mixer 53, and is supplied to the combustion chamber 33 of the output cylinder 3. Further, the EGR gas amount adjusting valve 78 is opened as needed to introduce the EGR gas into the combustion chamber 33 of the output cylinder 3 through the output cylinder EGR passage 76.

Through the above process, the air, the reformed fuel, and the EGR gas are introduced into the combustion chamber 33 of the output cylinder 3, and the equivalence ratio in the combustion chamber 33 is adjusted to approximately 0.1 to 0.8.

In the compression stroke, the leaned mixed gas is adiabatically compressed in the output cylinder 3. When the piston 32 reaches the compression top dead point, a small amount of fuel is injected from the injector 35. This ignites the air-fuel mixture in the combustion chamber 33, and premixed combustion of the lean mixture is performed. In cases where the air-fuel mixture in the combustion chamber 33 is self-ignited (premixed compression self-ignition) without injection of the fuel from the injector 35, the injection of the fuel from the injector 35 is not necessarily required.

The above combustion reciprocates the piston 32 and rotates the crankshaft 11, thereby outputting an engine power. This engine power is transmitted to the screw shaft. Also, a part of the engine power is used as a drive source for the reciprocating movement of the piston 22 in the fuel reformation cylinder 2.

At the time of stopping supply of the reformed fuel to the output cylinder 3 due to emergency stop and the like of the internal combustion engine 1, the bypass amount adjusting valve 82 is opened. This introduces the reformed fuel into the exhaust passage 61 via the output cylinder bypass passage 81, and stops supply of the reformed fuel to the output cylinder 3.

With this internal combustion engine 1, combustion (uniform lean combustion) of the lean mixture is performed in the output cylinder 3. The NOx emission amount and the soot discharge amount can therefore be reduced. Thus, it is possible to eliminate or significantly reduce the capacity of a post-processing apparatus for purifying exhaust gas. Further, since a fuel with a high anti-knock property is combusted, knocking is suppressed or reduced, and since diesel micro-pilot ignition enables combustion at a suitable timing, the combustion efficiency can be also improved.

—Reforming Reaction Possible Range—

The following describes a condition for enabling a reforming reaction in the fuel reformation chamber 23 of the fuel reformation cylinder 2. To enable the fuel reforming reaction, the equivalence ratio of the air-fuel mixture in the fuel reformation chamber 23 and the temperature of the fuel reformation chamber 23 (gas temperature) both need to be within a range that enables the reforming reaction. Further, the gas temperature required for causing the reforming reaction of the fuel is different depending on the equivalence ratio of the air-fuel mixture in the fuel reformation chamber 23. Therefore, to enable the fuel reforming reaction, the temperature of the fuel reformation chamber 23 needs to be a temperature (temperature which is equal to or higher than the lowest temperature that enables the reforming reaction) according to the equivalence ratio of the air-fuel mixture.

Figure 3:
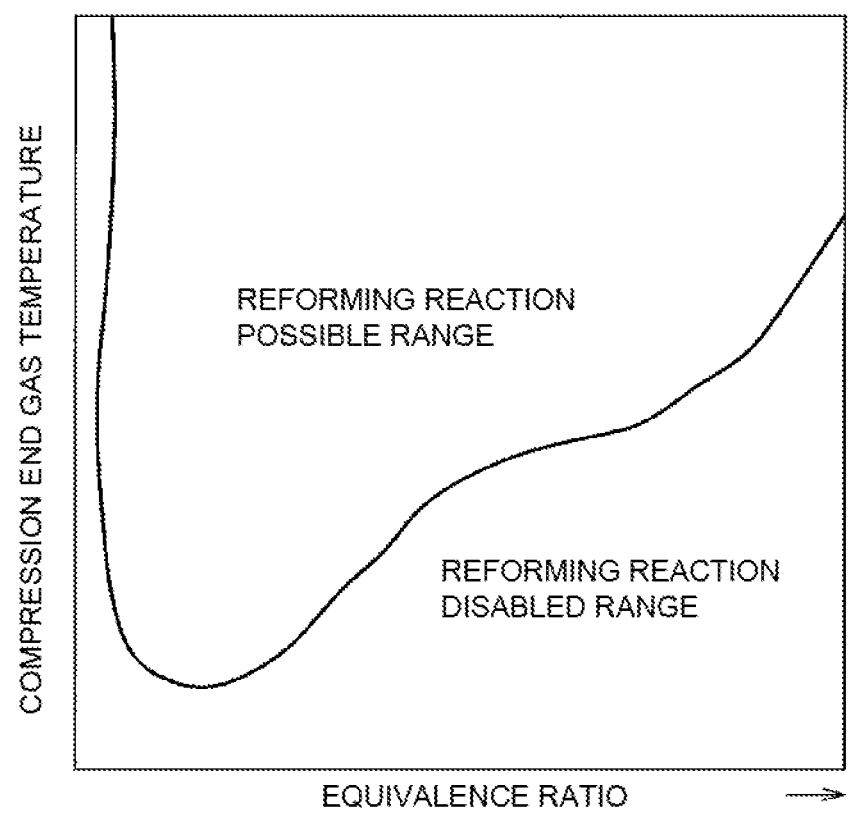
FIG. 3 A diagram showing the relationship among an equivalence ratio, a compression end gas temperature, and a reforming reaction possible range.

FIG. 3 is a diagram showing a relationship amongst an equivalence ratio of air-fuel mixture in the fuel reformation chamber 23 (horizontal axis), a gas temperature in the fuel reformation chamber 23 at a time point when the piston 22 reaches the compression top dead point in the fuel reformation cylinder 2 (hereinafter, compression end gas temperature; vertical axis), and the reforming reaction possible range. As shown in FIG. 3, to enable a reforming reaction in the fuel reformation chamber 23, an equivalent ratio of a predetermined value or more (e.g., 2 or more) is required as an equivalence ratio of the air-fuel mixture in the fuel reformation chamber 23, and the compression end gas temperature required for reforming reaction increases with an increase in the equivalence ratio. That is, to enable reforming reaction in the fuel reformation chamber 23, the compression end gas temperature needs to be increased with an increase in the equivalence ratio of the air-fuel mixture in the fuel reformation chamber 23.

—Control of Fuel Reforming Operation—

Next, the following describes control of the fuel reforming operation, which is a characteristic of the present embodiment. As described above, to enable reforming reaction in the fuel reformation chamber 23, the compression end gas temperature needs to be higher with an increase in the equivalence ratio of the air-fuel mixture in the fuel reformation chamber 23. That is, there is a lower limit value in the compression end gas temperature (the temperature may be hereinafter referred to as reforming reaction enabling temperature) for enabling the reforming reaction, based on the equivalence ratio of the air-fuel mixture. Therefore, if the compression end gas temperature is lower than the lower limit value of the reforming reaction enabling temperature based on the equivalence ratio of the air-fuel mixture, the reforming reaction of the fuel in the fuel reformation chamber 23 may not be possible or may not be sufficient, even when the fuel is supplied from the injector 25 to the fuel reformation chamber 23. Such a circumstance may likely to take place, for example, immediately after cold start of the internal combustion engine 1, or in an environment with low outside air temperature, high altitude, or the like.

If the reforming reaction is not possible, fuel with a low anti-knock property (light oil and the like) is supplied to the output cylinder 3, leading to a situation where occurrence of knocking in the output cylinder 3 is concerned.

In view of this problem, in the present embodiment, the reforming operation allowable lower limit gas temperature is set based on the lower limit value of the reforming reaction enabling temperature, according to the equivalence ratio of the air-fuel mixture. When the gas temperature (compression end gas temperature) of the fuel reformation chamber 23 at the time point when the piston 22 in the fuel reformation cylinder 2 reaches the compression top dead point (the time point when the periodically changing gas temperature in the fuel reformation cylinder of the present invention reaches its highest temperature) does not reach the reforming operation allowable lower limit gas temperature, the fuel reforming operation in the fuel reformation cylinder 2 is not executed. This is specifically described hereinbelow.

In the control of the fuel reforming operation in the present embodiment, the estimated actual compression end gas temperature is compared with the reforming operation allowable lower limit gas temperature.

When the actual compression end gas temperature is estimated to be equal to or higher than the reforming operation allowable lower limit gas temperature, the fuel reforming operation of the fuel reformation cylinder 2 is enabled (executed) in that cycle. In other words, fuel is supplied from the injector 25 to the fuel reformation chamber 23 (fuel is supplied to set a high equivalence ratio in the fuel reformation chamber 23 for enabling the reforming reaction).

To the contrary, when the actual compression end gas temperature is estimated to be lower than the reforming operation allowable lower limit gas temperature, the fuel reforming operation of the fuel reformation cylinder 2 is prohibited (not executed) in that cycle. When the fuel reforming operation in the fuel reformation cylinder 2 is prohibited as described above, the fuel reformation cylinder 2 functions as a cylinder for obtaining an engine power as in the case of the output cylinder 3. Alternatively, supply of fuel to the fuel reformation chamber 23 of the fuel reformation cylinder 2 is stopped (fuel supply from the injector 25 is stopped).

In the following, an operation of calculating an actual compression end gas temperature (estimating operation), an operation of setting the reforming operation allowable lower limit gas temperature (reforming operation allowable lower limit gas temperature set based on the lower limit value of the reforming reaction enabling temperature), and control of the fuel reforming operation using the actual compression end gas temperature and the reforming operation allowable lower limit gas temperature are described in this order.

(Operation of Calculating Compression End Gas Temperature)

First, the operation of calculating the actual compression end gas temperature (estimating operation) will be described.

The actual compression end gas temperature in the fuel reformation chamber 23 can be calculated (estimated) by the following formula (1).

[Formula 1]

$$T_{TDC} = T_{ini} \cdot \varepsilon^{\kappa-1} \tag{1}$$

In the formula (1), $T_{TDC}$ is the compression end gas temperature, $T_{ini}$ is the gas temperature before the compression; i.e., the taken-in gas temperature, $\varepsilon$ is the effective compression ratio of the fuel reformation cylinder 2, and $\kappa$ is the polytropic number of the taken-in gas in the fuel reformation chamber 23.

The following describes, calculation of each parameter in the formula (1).

(Intake-Gas Temperature $T_{ini}$)

The taken-in gas temperature $T_{ini}$ is calculated based on the output signal from the taken-in gas temperature sensor 103. The taken-in gas temperature $T_{ini}$ calculated here is the temperature of the taken-in gas on the downstream side of a portion of the fuel reformation cylinder EGR passage 71 communicating with the fuel reformation cylinder air-intake passage 42.

Alternatively, the temperature of the taken-in gas flowing through the air-intake port of the fuel reformation cylinder 2 may be adopted as the taken-in gas temperature $T_{ini}$, instead of the temperature of the taken-in gas flowing through the fuel reformation cylinder air-intake passage 42. Alternatively, the gas temperature of the fuel reformation chamber 23 at the time when the piston 22 reaches the intake bottom dead point or the gas temperature of the fuel reformation chamber 23 at the time when the air-intake valve 26 is closed may be detected or estimated, and used as the taken-in gas temperature $T_{ini}$.

(Effective Compression Ratio ε of Fuel Reformation Cylinder)

An effective compression ratio ε of the fuel reformation cylinder 2 is calculated as a ratio of a volume of the fuel reformation chamber 23 at a time point when the air-intake valve 26 in the fuel reformation cylinder 2 is closed and a volume of the fuel reformation cylinder 23 at a time point when the piston 22 reaches the compression top dead point. The effective compression ratio ε of the fuel reformation cylinder 2 may be obtained simply on a basis of the ratio of the volume of the fuel reformation chamber 23 when the piston 22 is at the bottom dead point and the volume of the fuel reformation chamber 23 when the piston 22 is at the top dead point (apparent compression ratio).

(Polytropic Number κ)

The polytropic number κ is defined as a ratio of a specific heat at constant pressure and a specific heat at constant volume in the gas compression stroke in the fuel reformation chamber 23. When the total amount of taken-in gas is air and there is no heat outflow to the cylinder wall surface, κ=about 1.4. However, since the actual polytropic number of the taken-in gas in the fuel reformation chamber 23 differs from that in cases where the total amount is air or where there is no heat outflow. Therefore, the polytropic number is modified as described below.

To the polytropic number κ in the formula (1), a polytropic number obtained through any one of: modification based on the cooling water temperature, modification based on the gas composition, and modification of the equivalence ratio. Alternatively, a polytropic number obtained through a combination of two or more of these modifications may be applied to the polytropic number κ in the formula (1).

Modification of Polytropic Number Based on Cooling Water Temperature

The polytropic number κ varies according to the amount of heat loss. As described above, the cooling water passage 13 is formed in the cylinder block, and there is a heat outflow toward the cooling water flowing through the cooling water passage 13. Therefore, the amount of heat loss can be predicted by calculating the temperature of the cooling water based on the output from the water temperature sensor 106. Alternatively, by grasping the relationship between the cooling water temperature and the amount of heat loss in advance, the amount of heat loss can be estimated from the cooling water temperature.

Figure 4:
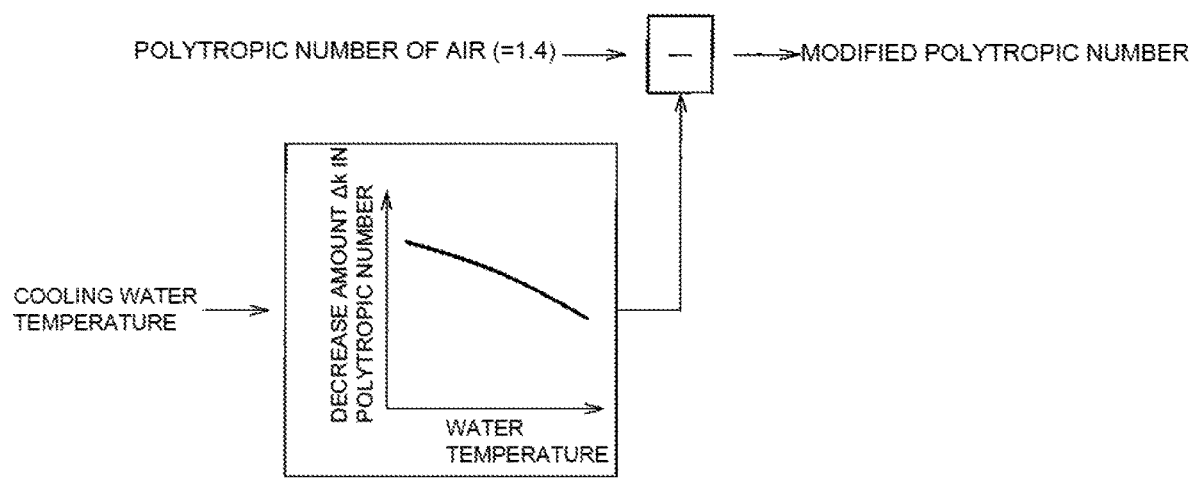
FIG. 4 A block diagram showing arithmetic logic of a modified polytropic number based on the cooling water temperature.

FIG. 4 is a block diagram showing arithmetic logic of a modified polytropic number based on the cooling water temperature. As shown in FIG. 4, a decrease amount Δκ in the polytropic number is evaluated from the cooling water temperature calculated based on the output from the water temperature sensor 106. By subtracting this decrease amount from the polytropic number of the air, the modified polytropic number corresponding to the cooling water temperature (corresponding to the heat loss amount) can be obtained. The relationship between the cooling water temperature and the decrease amount Δκ of the polytropic number is obtained in advance by an experiment or a simulation.

Modification of Polytropic Number Based on Gas Composition

The polytropic number κ also varies according to the gas composition in the fuel reformation chamber 23. That is, when the taken-in gas is entirely the air, most of the taken-in gas is 2 atomic molecules, and the polytropic number κ is about "1.4". On the other hand, if the taken-in gas contains burned gas ($CO_2$ or $H_2O$) or a fuel, the ratio of the 2 atomic molecules decreases, and so does the polytropic number κ.

Therefore, based on an output signal from the taken-in gas $O_2$ sensor 104, a mole fraction of carbon dioxide in the taken-in gas is calculated based on the mole fraction of oxygen in the intake-gas. Then, the polytropic number is estimated based on the mole fraction of each gas component.

For example, a molar specific heat at constant pressure of the taken-in gas is first determined according to the following formula (2).

[Formula 2]

$$C_{p\_intake} = \sum_i \psi_i \cdot C_{p\_i} \qquad (2)$$

In the formula (2), $C_{p\#intake}$ is the molar specific heat at constant pressure of the taken-in gas, $\psi_1$ is the mole fraction of each gas component, and $C_{p\#1}$ is the molar specific heat at constant pressure of each gas component.

Thus, the polytropic number κ of the taken-in gas can be calculated with the following formula (3).

[Formula 3]

$$\kappa = \frac{C_{p\_intake}}{C_{p\_intake} - 8.314} \qquad (3)$$

This way, the modified polytropic number corresponding to the gas composition can be obtained.

Modification of Polytropic Number Based on Equivalence Ratio

By estimating the equivalence ratio in the fuel reformation chamber 23, the polytropic number κ can be also obtained through correcting calculation from that equivalence ratio.

Figure 5:
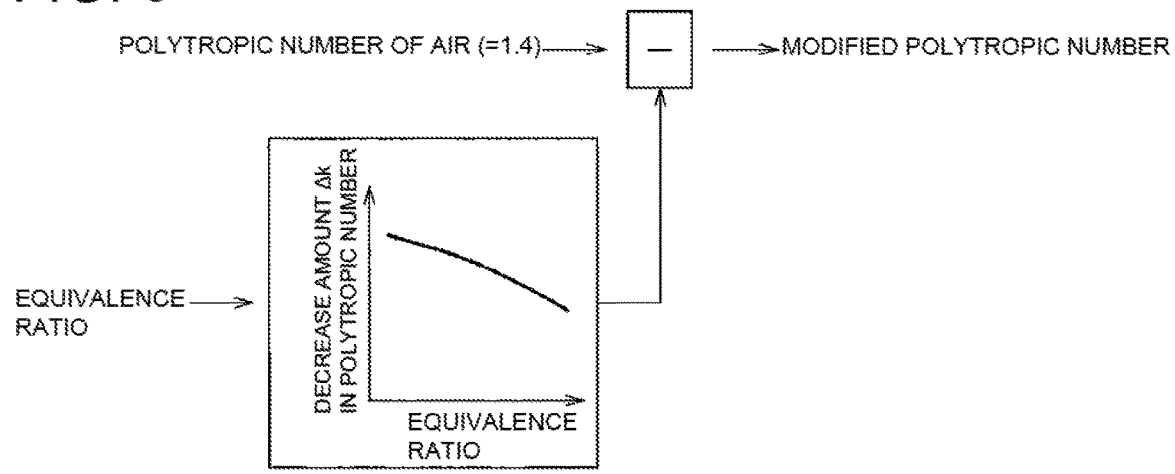
FIG. 5 A block diagram showing arithmetic logic of a modified polytropic number based on the equivalence ratio.

FIG. 5 is a block diagram showing arithmetic logic of a modified polytropic number based on the equivalence ratio. As shown in FIG. 5, a decrease amount Δκ in the polytropic number is evaluated from the equivalence ratio. By subtracting this decrease amount from the polytropic number of the air, the modified polytropic number corresponding to the equivalence ratio can be obtained. The relationship between the equivalence ratio and the decrease amount Δκ of the polytropic number is obtained in advance by an experiment or a simulation.

A method of calculating the equivalence ratio in this case is as follows. Namely, the flow rate of the taken-in air is calculated based on the output signal from the intake-air flow sensor 101. Further, an EGR gas amount (an amount of EGR gas introduced into the fuel reformation cylinder 2) is calculated from a difference between the pressure of the taken-in gas calculated based on the output signal from the taken-in gas pressure sensor 102 and the pressure of the exhaust gas calculated based on the output signal from the exhaust pressure sensor 105. The equivalence ratio is calculated from the flow rate of the taken-in air, the EGR gas amount, and the fuel supply amount to the fuel reformation chamber 23 (i.e., the fuel supply amount evaluated from an injection command value to the injector 25). In cases of not considering the EGR gas amount, the equivalence ratio may be calculated from a ratio of the flow rate of the taken-in air calculated based on the output signal from the intake-air flow sensor 101 and the fuel supply amount to the fuel reformation chamber 23.

(Setting Operation of Reforming Operation Allowable Lower Limit Gas Temperature)

Next, the following describes an operation of setting the reforming operation allowable lower limit gas temperature (which substantially matches with the lower limit value of the reforming reaction enabling temperature of the present embodiment). As described above, the reforming operation allowable lower limit gas temperature is set based on the equivalence ratio of the air-fuel mixture. That is, as is obvious from FIG. 3, the lower limit value of the reforming reaction enabling temperature becomes higher with an increase in the equivalence ratio of the air-fuel mixture, and therefore the reforming operation allowable lower limit gas temperature is set to a higher value, with an increase in the equivalence ratio of the air-fuel mixture in the fuel reformation chamber 23. Further, the lower limit value of the reforming reaction enabling temperature varies depending on not only the equivalence ratio of the air-fuel mixture, but also on the type of the fuel. For example, if the ratio of carbon and hydrogen in the fuel is different, the reactivity of the fuel is largely varied. In cases of an oxygen-containing fuel containing oxygen atoms in a fuel molecules, the reactivity of the fuel largely varies depending on the amount of oxygen. Thus, the type of fuel is considered for setting the reforming operation allowable lower limit gas temperature.

Figure 6:
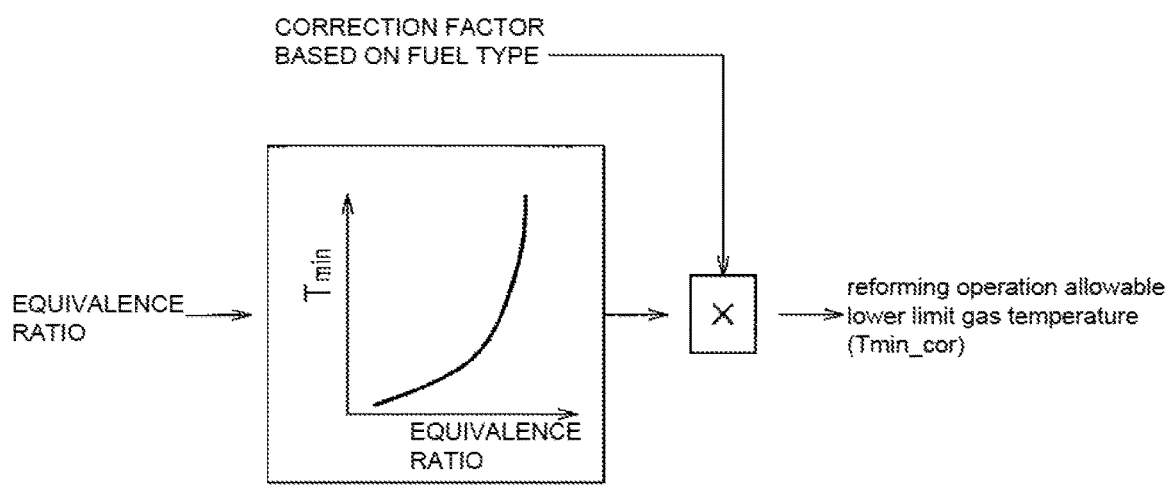
FIG. 6 A block diagram showing arithmetic logic of a reforming operation allowable lower limit gas temperature.

FIG. 6 is a block diagram showing arithmetic logic of a reforming operation allowable lower limit gas temperature. As shown in FIG. 6, a base value $T_{min}$ of the reforming operation allowable lower limit gas temperature is obtained based on the equivalence ratio of the air-fuel mixture. This base value is multiplied by a correction factor which is based on the type of the fuel to correct the base value $T_{min}$ of the reforming operation allowable lower limit gas temperature, thereby obtaining the reforming operation allowable lower limit gas temperature $T_{min\_cor}$ corresponding to the equivalence ratio of the air-fuel mixture and the type of the fuel.

The relationship between the equivalence ratio of the air-fuel mixture and the base value $T_{min}$ of the reforming operation allowable lower limit gas temperature is obtained in advance by an experiment or a simulation. Specifically, as should be understood from FIG. 3, the relationship between the equivalence ratio of the air-fuel mixture and the base value $T_{min}$ of the reforming operation allowable lower limit gas temperature is such that the higher the equivalence ratio of the air-fuel mixture, the higher the base value $T_{min}$.

Therefore, the reforming operation allowable lower limit gas temperature $T_{min\#cor}$ is higher with a higher equivalence ratio of the fuel reformation chamber 23.

Further, as described above, the lower limit value of the reforming reaction enabling temperature varies also depending on the type of the fuel. To correct the base value $T_{min}$ of the reforming operation allowable lower limit gas temperature according to the type of the fuel, the base value $T_{min}$ of the reforming operation allowable lower limit gas temperature is multiplied by a correction factor based on the type of the fuel, thereby obtaining the reforming operation allowable lower limit gas temperature $T_{min\#cor}$ corresponding to the type of the fuel to be used. As a value of the correction factor which is based on the type of the fuel, the relationship between the type of the fuel and the value of the correction factor is grasped in advance by an experiment or a simulation. Then, the value of the correction factor corresponding to the type of the fuel to be used is applied to the arithmetic logic shown in FIG. 6. The value of the correction factor which is based on the type of the fuel is input to the ECU 100 in advance, according to the type of the fuel to be supplied to the not-shown fuel tank.

(Control of Fuel Reforming Operation)

Next, the following describes control of the fuel reforming operation using the compression end gas temperature $T_{TDC}$ and the reforming operation allowable lower limit gas temperature $T_{min\#cor}$.

Figure 7:
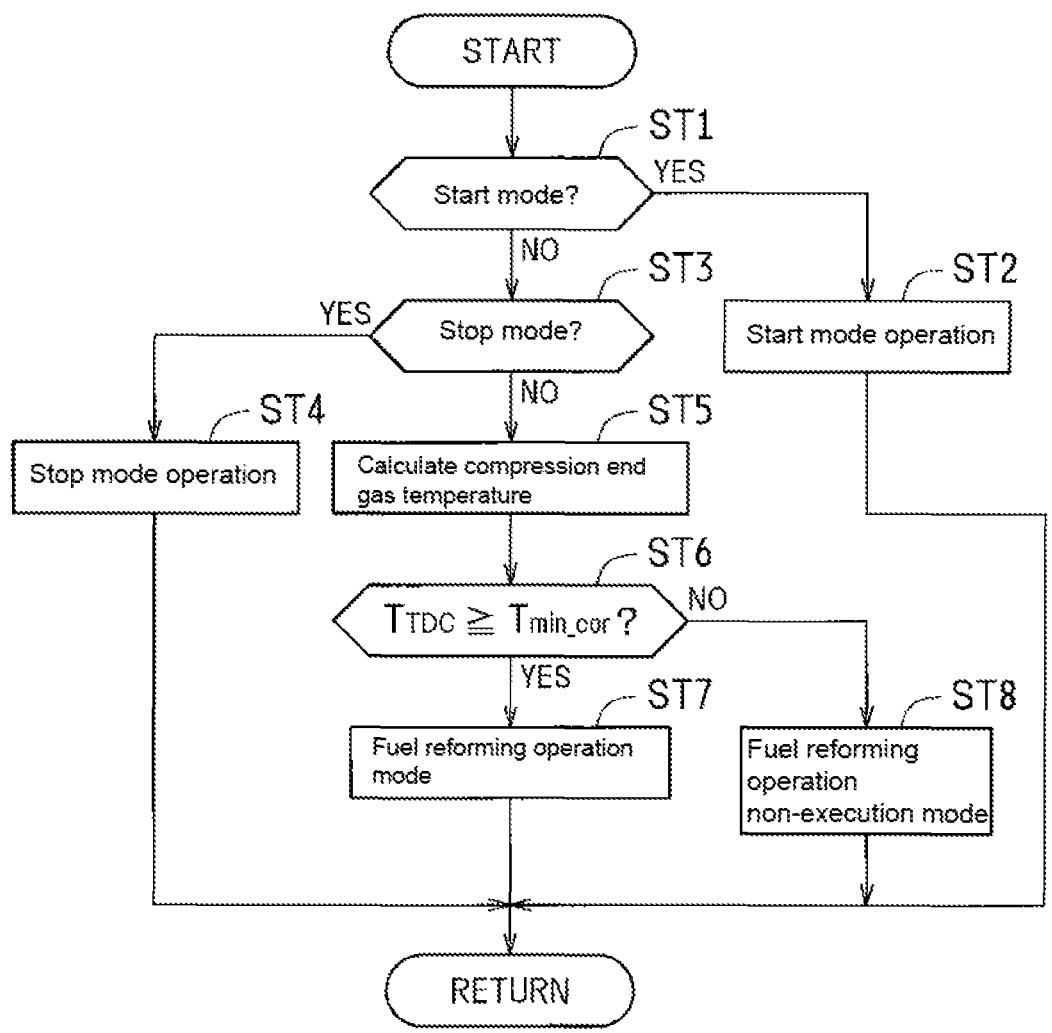
FIG. 7 A flowchart showing a control procedure for performing switching between executing and not-executing of a fuel reforming operation.

FIG. 7 is a flowchart showing a control procedure for performing switching between executing and not-executing of a fuel reforming operation.

First, in step ST 1, whether or not the operation mode of the internal combustion engine 1 is in the start mode is determined. This start mode is a mode to be entered immediately after starting of the internal combustion engine 1. That is the operation mode enters the start mode when the internal combustion engine 1 is started by, for example, an ON-operation of the start switch. The start mode is continued for a predetermined period.

The step ST1 results in YES if the operation mode of the internal combustion engine 1 is the start mode, and the process proceeds to the step ST2 and continued in the start mode.

Specifically, in the start mode, a not-shown starter rotates (cranks) the crankshaft 11, and a predetermined amount of fuel is injected from the injectors 25, 35 of the fuel reformation cylinder 2 and the output cylinder 3, respectively. The fuel injection at this time is set so that the equivalence ratio in each of the fuel reformation chamber 23 and the combustion chamber 33 is less than 1. Thus, combustion takes place in each of the fuel reformation chamber 23 and the combustion chamber 33. Cranking by the starter is continued until each of the cylinders 2, 3 are independently operable. The start mode ends when the cylinders 2, 3 are each in the independently operable state. This is for not executing fuel reforming operation, because no fuel reforming reaction is expectable in the fuel reformation cylinder 2, due to the low rotational speed of the internal combustion engine 1 during the start mode.

When the operation mode of the internal combustion engine 1 is not in the start mode and the step ST1 results in NO, the process proceeds to the step ST3 to determine whether or not the operation mode of the internal combustion engine 1 is in the stop mode. This stop mode is a mode to be entered at the time of stopping the internal combustion engine 1. That is, when a stop instruction is given to the internal combustion engine 1 by, for example, ON-operation of the stop switch, the step ST3 results in YES and the process proceeds to the step ST4 and an operation of the stop mode is executed.

Specifically, in the stop mode, the fuel injection from the injector 25 of the fuel reformation cylinder 2 is stopped. This stops the reforming reaction of the fuel in the fuel reformation chamber 23, and supply of the reformed fuel to the combustion chamber 33 is therefore stopped. Hence, the internal combustion engine 1 is stopped. This is for not executing fuel reforming operation in the fuel reformation cylinder 2, because supply of the fuel to the fuel reformation cylinder 2 should be stopped during the stop mode.

As described hereinabove, the fuel reforming operation in the fuel reformation cylinder 2 is not executed regardless of the compression end gas temperature $T_{TDC}$, when the operation mode is the start mode or the stop mode.

When the internal combustion engine 1 is not in the stop mode and the step ST3 results in NO, the process proceeds to the step ST5 to calculate (estimate) the compression end gas temperature $T_{TDC}$ with the above mentioned formula (1). In other words, the taken-in gas temperature $T_{ini}$, the effective compression ratio ε of the fuel reformation cylinder 2, and the polytropic number κ are calculated as hereinabove described, and are applied to the above formula (1) to calculate the compression end gas temperature $T_{TDC}$. It should be noted that, in cases where the closing timing of the air-intake valve 26 is fixed, the effective compression ratio ε does not have to be calculated, and the effective compression ratio ε is a fixed value.

After calculation of the compression end gas temperature $T_{TDC}$ as described above, the process proceeds to the step ST6 and by comparing the compression end gas temperature $T_{TDC}$ with the reforming operation allowable lower limit gas temperature $T_{min\#cor}$ whether or not the reforming reaction is possible is determined. Specifically, whether or not the compression end gas temperature $T_{TDC}$ is equal to or higher than the reforming operation allowable lower limit gas temperature $T_{min\#cor}$ is determined.

If the compression end gas temperature $T_{TDC}$ is equal to or higher than the reforming operation allowable lower limit gas temperature $T_{min\#cor}$, the step ST6 results in YES, determining that the reforming reaction is possible. On the other hand, if the compression end gas temperature $T_{TDC}$ is less than the reforming operation allowable lower limit gas temperature $T_{min\#cor}$, the step ST6 results in NO, determining that the reforming reaction is not possible.

When a reforming reaction is possible and the step ST6 results in YES, the fuel reforming operation is executed in the step ST7. That is, the operation mode of the internal combustion engine 1 turns into a fuel reforming operation mode. As described in the basic operation of the internal combustion engine 1, in the fuel reforming operation mode, the fuel is supplied from the injector 25 to the fuel reformation chamber 23 (fuel is supplied to set a high equivalence ratio in the fuel reformation chamber 23 for enabling the reforming reaction).

On the other hand, when the reforming reaction is not possible and the step ST6 results in NO, the fuel reforming operation is not executed in the step ST8. In other words, the operation mode of the internal combustion engine 1 is in the fuel reforming operation non-execution mode. In this fuel reforming operation non-execution mode, a predetermined amount of fuel is injected from the injectors 25, 35 of the fuel reformation cylinder 2 and the output cylinder 3, respectively, as in the case of the start mode. The fuel injection at this time is set so that the equivalence ratio in each of the fuel reformation chamber 23 and the combustion chamber 33 is less than 1. That is, in the fuel reformation chamber 23 and the combustion chamber 33, an amount of fuel within a range that allows fuel combustion and that makes the equivalence ratio to be less than 1 is supplied from the injectors 25, 35, respectively.

Through the above, combustion takes place in each of the fuel reformation chamber 23 of the fuel reformation cylinder 2 and the combustion chamber 33 of the output cylinder 3. Thus, engine power is obtained from each of the fuel reformation cylinder 2 and the output cylinder 3. The fuel injection amount from each of the injectors 25, 35 of the cylinders 2, 3 is set so that the engine output from the cylinders 2, 3 sums up to a required engine power.

As described above, the fuel reformation cylinder 2 can function as a cylinder for obtaining an engine power as in the case of the output cylinder 3, and can function as a fuel reformation device as hereinabove described.

In the fuel reforming operation non-execution mode, the air-fuel mixture is combusted in the fuel reformation chamber 23. This promotes warming-up of the fuel reformation cylinder 2, and causes the compression end gas temperature $T_{TDC}$ to reach the reforming operation allowable lower limit gas temperature $T_{min\#cor}$ in a relatively short time. Therefore, the fuel reforming operation non-execution mode can be changed to the fuel reforming operation mode at an early stage.

When the fuel reforming operation is not executed in the step ST8 (i.e., when the operation mode is set to the fuel reforming operation non-execution mode), the supply of fuel to the fuel reformation chamber 23 may be stopped. In other words, the supply of fuel to the fuel reformation chamber 23 is stopped until the compression end gas temperature $T_{TDC}$ reaches the reforming operation allowable lower limit gas temperature $T_{min\#cor}$. In this case, an amount of fuel is injected from the injector 35 of the output cylinder 3 based on the required engine power. As a result, an engine power is obtained from the output cylinder 3.

By repeating the above operation, for example, the fuel reforming operation is not executed (the operation mode is set to the fuel reforming operation non-execution mode) if the compression end gas temperature $T_{TDC}$ has not yet reached the reforming operation allowable lower limit gas temperature $T_{min\#cor}$, after the start mode is cancelled. Further, even when the compression end gas temperature $T_{TDC}$ reaches the reforming operation allowable lower limit gas temperature $T_{min\#cor}$ and the fuel reforming operation is executed (the operation mode enters the fuel reforming operation mode), the fuel reforming operation is stopped (the operation mode is set to the fuel reforming operation non-execution mode) if compression end gas temperature $T_{TDC}$ drops below the reforming operation allowable lower limit gas temperature $T_{min\#cor}$.

The operation of the steps ST6 to the step ST8 corresponds to "an operation by the reforming operation control unit, wherein the operation does not execute the fuel reforming operation in the fuel reformation cylinder when the gas temperature at the time point when the periodically-changing gas temperature in the fuel reformation cylinder reaches the highest temperature (i.e., the time point when the piston in the fuel reformation cylinder reaches the compression top dead point) falls short of the reforming operation allowable lower limit gas temperature set based on the lower limit value of the reforming reaction enabling temperature" of the present invention.

The control of the fuel reforming operation is executed by the ECU 100. Therefore, the functional part of the ECU 100 that executes this control corresponds to the control device described in the present invention. Further, a method of control executed by the ECU 100 corresponds to a control method referred to in the present invention.

As hereinabove described, in the present embodiment, a fuel reforming operation in a fuel reformation cylinder 2 is not executed when a gas temperature of the fuel reformation chamber 23 at a time point when a piston 22 in the fuel reformation cylinder 2 reaches a compression top dead point (compression end gas temperature) is estimated to fall short of a reforming operation allowable lower limit gas temperature set based on the equivalence ratio of the air-fuel mixture and the like. This way, supply of non-reformed fuel from the fuel reformation cylinder 2 to the output cylinder 3 due to a low gas temperature (low compression end gas temperature) can be avoided. Therefore, a fuel with a low anti-knock property is not supplied to the output cylinder, and knocking in the output cylinder 3 can be avoided.

Further, in the present embodiment, the fuel reforming operation in the fuel reformation cylinder 2 is not executed when the compression end gas temperature $T_{TDC}$ is estimated as to fall short of the reforming operation allowable lower limit gas temperature $T_{min\#cor}$. Therefore, whether or not the reforming reaction of the fuel is possible in the cycle can be determined. As a result, whether to execute the fuel reforming operation in the fuel reformation cylinder 2 can be accurately determined.

Other Embodiments

Note that the above embodiment is illustrative in all respects, and is not intended to be a basis for limiting interpretation. Accordingly, the scope of the present invention is not to be interpreted solely by the foregoing embodiments, but is defined based on the description of the appended claims. Further, the technical scope of the present invention includes all changes within the meaning and scope of the appended claims.

For example, the above embodiment deals with a case where the present invention is applied to an internal combustion engine 1 for a ship, but the present invention is also applicable to an internal combustion engine in other applications (e.g., an electric power generator, a vehicle, and the like).

Further, the above embodiment deals with a case where the injectors 25, 35 of the cylinders 2, 3 are direct injection type which directly inject fuel into the cylinders. The present invention is not limited to this, and either or both of the injectors 25, 35 may be of a port injection type.

Further, the above embodiment deals with a case where the fuel to be supplied to the fuel reformation chamber 23 is light oil. The present invention is not limited to this, and the fuel may be heavy oil, gasoline, or the like.

In addition, the above embodiment deals with a case where the fuel reformation cylinder 2 and the output cylinder 3 are operated at the same rotational speed. The present invention is not limited to this, and the speed reducer may be interposed between the cylinders 2, 3 (to the crankshaft 11 between the cylinders 2, 3), and the rotational speed of the fuel reformation cylinder 2 may be lower than the rotational speed of the output cylinder 3.

In addition, the above embodiment deals with a case where the engine power obtained from the output cylinder 3 is partially used as a drive source for reciprocation of the piston 22 in the fuel reformation cylinder 2. The present invention is not limited to this, and the drive source for the fuel reformation cylinder 2 may be provided separately. For example, the fuel reformation cylinder 2 and the output cylinder 3 may be separately arranged (arranged without being connected by the crankshaft 11), and the piston 22 of the fuel reformation cylinder 2 may be reciprocated by an electric motor or the like.

Further, the above embodiment deals with a case where the compression end gas temperature $T_{TDC}$ and the reforming operation allowable lower limit gas temperature $T_{min\#cor}$ are compared to determine whether or not reforming reaction is possible. The present invention is not limited to this. For example, if it is possible to determine whether or not the reforming reaction is possible simply based on the taken-in gas temperature $T_{ini}$ calculated based on the output signal from the taken-in gas temperature sensor 103, the operation mode may be set so that the fuel reforming operation in the fuel reformation cylinder 2 is not executed, based on only the taken-in gas temperature $T_{ini}$ (the fuel reforming operation is not executed when the taken-in gas temperature $T_{ini}$ is less than a predetermined value).

In addition, in the above embodiment, the reforming operation allowable lower limit gas temperature $T_{min\#cor}$ is made substantially equal to the lower limit value of the reforming reaction enabling temperature. The present invention is not limited to this, and the reforming operation allowable lower limit gas temperature $T_{min\#cor}$ may be set at a temperature a predetermined value higher than the lower limit value of the reforming reaction enabling temperature. With this, the operation mode can be changed from the fuel reforming operation non-execution mode to the fuel reforming operation mode, when the compression end gas temperature $T_{TDC}$ is sufficiently high. Therefore, reliability of the reforming reaction of the fuel in the fuel reformation cylinder 2 can be further improved.

This application claims priority from Japanese Patent Application No. 2016-139570, filed in Japan on Jul. 14, 2016. The entire content of the application is hereby incorporated in the present application by reference.

INDUSTRIAL APPLICABILITY

The present invention is applicable to control of an internal combustion engine including a fuel reformation cylinder and an output cylinder.

REFERENCE SIGNS LIST 1 internal combustion engine
2 fuel reformation cylinder
21 cylinder bore
22 piston
3 output cylinder
100 ECU

The invention claimed is:

1. A control device for an internal combustion engine including a fuel reformation cylinder and an output cylinder to which reformed fuel generated in the fuel reforming cylinder is supplied, the output cylinder being configured to yield an engine power by combusting the reformed fuel, the control device comprising:

a reforming operation control unit configured not to execute a fuel reforming operation in the fuel reformation cylinder, when a gas temperature in the fuel reformation cylinder at a time point when a periodically changing gas temperature in the fuel reformation cylinder reaches its highest temperature is estimated to fall short of a reforming operation allowable lower limit gas temperature set based on a lower limit value of a reforming reaction enabling temperature; and wherein:
: the reforming operation allowable lower limit gas temperature is set so as to be higher with an increase in an air fuel mixture equivalence ratio in the fuel reformation cylinder;
: the fuel reformation cylinder is structured as a reciprocation type cylinder; and
: the gas temperature reaches its highest temperature when a piston in the fuel reformation cylinder reaches a compression top dead point.

2. The control device according to claim 1, wherein the reforming operation control unit is configured to:
: determine the air fuel mixture equivalence ratio in the fuel reformation cylinder; and
: calculate the reforming operation allowable lower limit gas temperature based on the air fuel mixture equivalence ratio.

3. The control device according to claim 2, wherein:
: the reforming operation allowable lower limit gas temperature is corrected based on a type of fuel to be supplied to the fuel reformation cylinder.

4. The control device according to claim 1, wherein:
: the fuel reforming operation in the fuel reformation cylinder is not executed during a start mode operation executed at an early start-up stage of the internal combustion engine and during a stop mode operation executed at a time of stopping of the internal combustion engine, irrespective of the gas temperature at the time point when the gas temperature in the fuel reformation cylinder reaches its highest temperature.

5. The control device according to claim 1, wherein:
: when the fuel reforming operation in the fuel reformation cylinder is not executed, an amount of fuel within a range that allows fuel combustion in the fuel reformation cylinder and that makes the air fuel mixture equivalence ratio in the fuel reformation cylinder less than 1 is supplied to the fuel reformation cylinder.

6. The control device according to claim 1, wherein:
: when the fuel reforming operation in the fuel reformation cylinder is not executed, a fuel supply to the fuel reformation cylinder is stopped, and an amount of fuel within a range that allows fuel combustion in the output cylinder is supplied to the output cylinder.

7. A control method for an internal combustion engine including a fuel reformation cylinder and an output cylinder to which reformed fuel generated in the fuel reforming cylinder is supplied, the output cylinder being configured to yield an engine power by combusting the reformed fuel, wherein:
: a fuel reforming operation in the fuel reformation cylinder is not executed, when a gas temperature in the fuel reformation cylinder, at a time point when a periodically changing gas temperature in the fuel reformation cylinder reaches its highest temperature, is estimated to fall short of a reforming operation allowable lower limit gas temperature set based on a lower limit value of a reforming reaction enabling temperature;
: the reforming operation allowable lower limit gas temperature is set so as to be higher with an increase in an air fuel mixture equivalence ratio in the fuel reformation cylinder;
: the fuel reformation cylinder is structured as a reciprocation type cylinder; and
: the gas temperature reaches its highest temperature when a piston in the fuel reformation cylinder reaches a compression top dead point.

8. The method of claim 7, further comprising determining the air fuel mixture equivalence ratio and calculating the reforming operation allowable lower limit gas temperature based on the equivalence ratio.

9. The method of claim 7, further comprising executing the fuel reforming operation in the fuel reformation cylinder when the gas temperature, at the time point when the periodically changing gas temperature in the fuel reformation cylinder reaches its highest temperature, is estimated to exceed the reforming operation allowable lower limit gas temperature.

10. The method of claim 7, further comprising injecting a first amount of fuel into the fuel reformation cylinder based on not executing the fuel reforming operation.

* * * * *